Dec. 8, 1964    W. M. McCONNELL    3,159,857
TAPER CUTTING BAR ATTACHMENT
Original Filed March 30, 1960    5 Sheets-Sheet 1

*INVENTOR.*
William Mynard McConnell

BY *Webb, Mackey & Burden*

*HIS ATTORNEYS*

Dec. 8, 1964  W. M. McCONNELL  3,159,857
TAPER CUTTING BAR ATTACHMENT
Original Filed March 30, 1960  5 Sheets-Sheet 3

INVENTOR.
William Mynard McConnell
BY Webb, Mackey & Burden
HIS ATTORNEYS

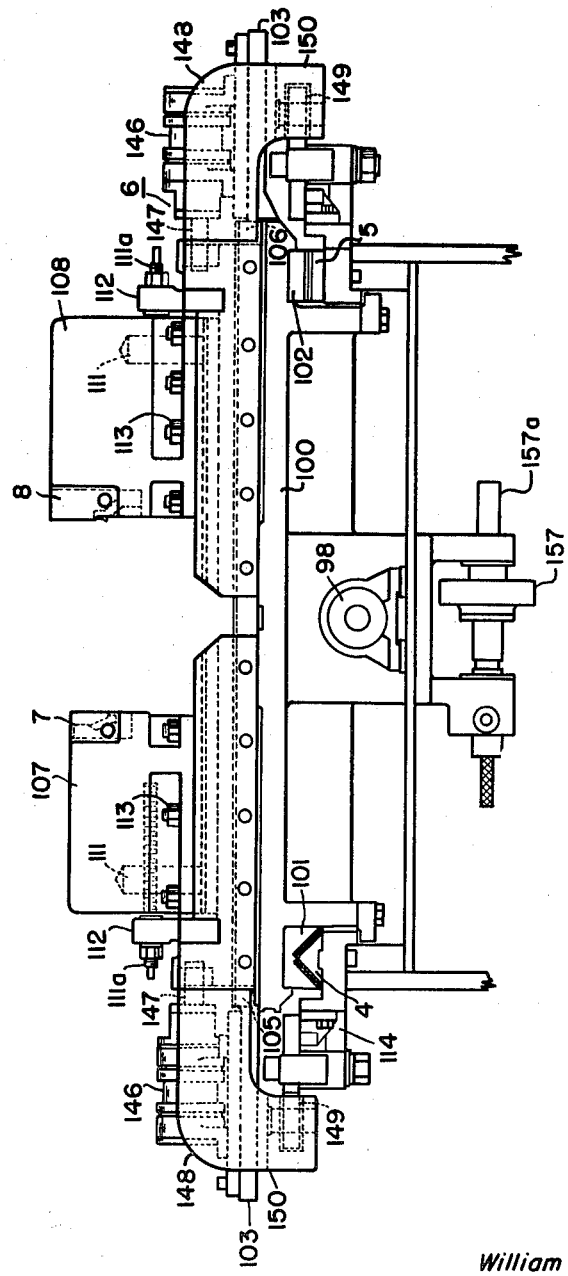

Dec. 8, 1964 W. M. McCONNELL 3,159,857
TAPER CUTTING BAR ATTACHMENT
Original Filed March 30, 1960 5 Sheets-Sheet 5
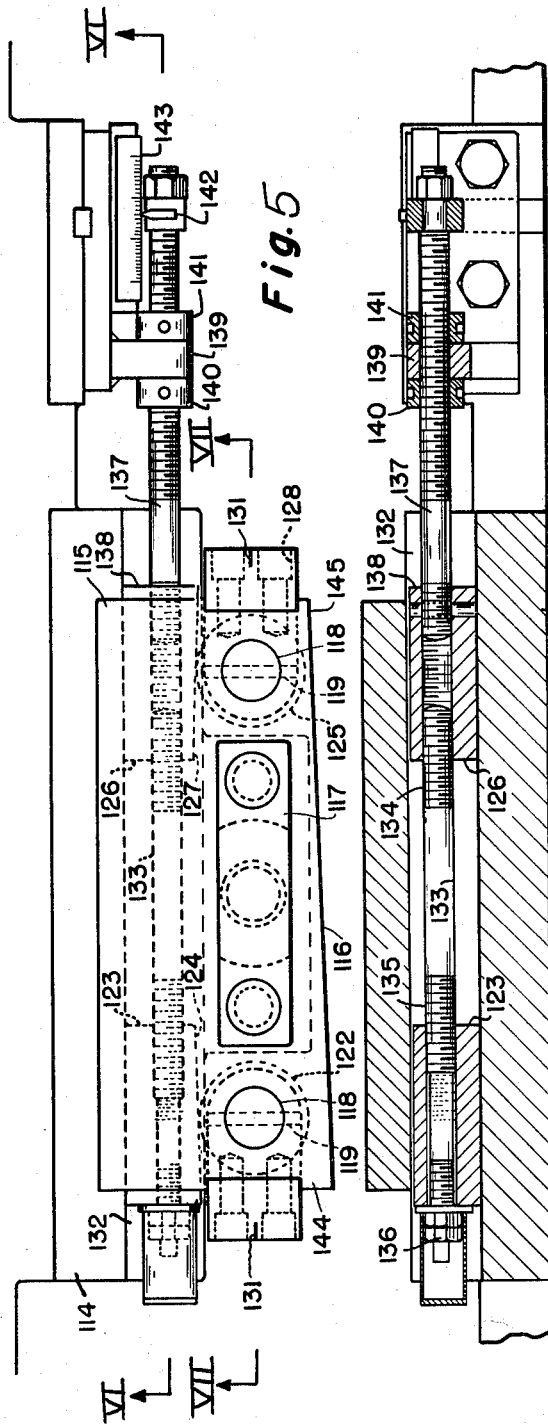
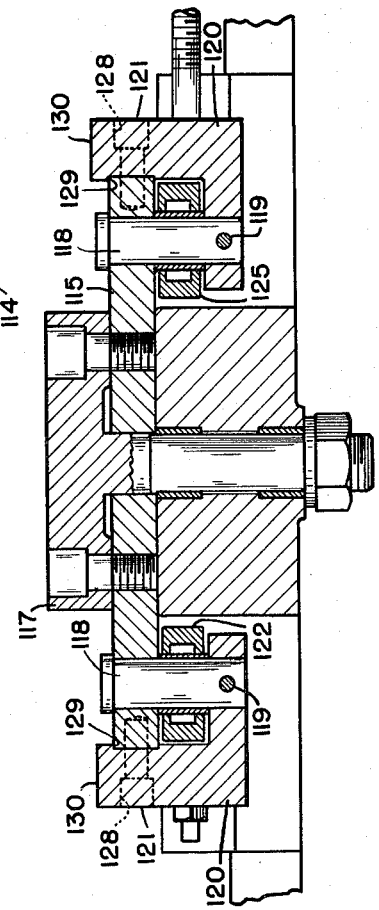
INVENTOR.
William Mynard McConnell
BY Webb, Mackey & Burden
HIS ATTORNEYS

United States Patent Office 3,159,857
Patented Dec. 8, 1964

3,159,857
TAPER CUTTING BAR ATTACHMENT
William Mynard McConnell, Pittsburgh, Pa., assignor to Taylor-Wilson Manufacturing Co., Pittsburgh, Pa., a corporation of Pennsylvania
Original application Mar. 30, 1960, Ser. No. 18,578, now Patent No. 3,128,482, dated Apr. 14, 1964. Divided and this application Feb. 6, 1964, Ser. No. 343,048
8 Claims. (Cl. 10—87)

This application is a division of my application Serial No. 18,578, filed March 30, 1960, now Patent No. 3,128,482, and relating to "Method of Supporting and Rotating Pipe for Threading Operation."

This invention relates to a guide device for regulation of feed of a tool into engagement with a workpiece upon which a fabrication or forming operation is performed. The invention has particular utility for pipe threading machines which impart taper and/or threads to ends of pipe and tubing used in oil well drilling operations, in pipe lines which convey petroleum products or gas over long distances, and in chemical plants, etc.

Heretofore, many pipe threading machines have used a combination of a plurality of chasers disposed in a housing or support to produce both taper and threads upon the end or ends of pipe. To obtain a specified amount of taper, a user positioned each chaser relative to the others and relative to the longitudinal axis of its housing or support. Since some of the positioning adjustments of these chasers were in thousandths of an inch, to produce the required taper, accurate location of the chasers was difficult and time-consuming, and on occasion included guess-work by the operator of the threading machine. Consequently, the amounts of taper obtained were not always uniform and failed to meet specification in many instances.

My invention cooperates with a tool fed to a rotating workpiece, and more especially with a tapering and/or threading tool fed to a rotating pipe to produce required amounts of taper and accurate threads, including round threads upon oval pipe. Specifically, the invention resides in a machine for holding and supporting a workpiece upon which is performed a work operation by a tool advanced into engagement with the workpiece, and comprises a tool holder which carries the tool and is movably mounted upon a frame of the machine for travel along a path which brings the tool into engagement with the workpiece. On the frame is a guide means positioned for engagement by a part of the tool holder as it travels along the path, and for regulation of the amount of engagement of the tool with the workpiece. This guide means comprises a bar pivotally mounted at a point intermediate its ends for movement of the bar about its pivot mounting. The bar includes a guide surface for engagement by the part of the tool holder whereby the guide surface controls movement of the tool holder, and thereby the tool, towards and away from the workpiece. The invention further includes a means for positioning the bar about its pivot mounting with the positioning means located for engagement with the bar intermediate its pivot mounting and one end of the bar and movable to place the bar in a given position about its pivot mounting.

One embodiment of this positioning means comprises two members disposed so that one member engages the bar between the pivot mounting and one end of the bar, and so that the other member engages the bar between its pivot mounting and the other end of the bar. These two members are movable to place the bar in given positions about the pivot mounting and connected to the two members is a means which effects movement of the bar about the pivot mounting. Each of the two members has a tapered surface which is located for engagement with the bar.

The guide surface of the guide means in one embodiment of my invention is tapered so that it imparts taper to the workpiece as the tool holder travels along the path while the tool is in engagement with the workpiece.

In the accompanying drawings, I have shown a preferred embodiment of my invention, in which:

FIGURE 4 is an end elevation view of a carriage which mounts tool holders, tools and chasers of the threader of FIGURE 1;

FIGURE 5 is a plan view of a sine or guide bar device of the threader of FIGURE 1;

FIGURE 6 is a section view along the line VI—VI of FIGURE 5; and

FIGURE 7 is a section view along the line VII—VII of FIGURE 5.

Figure 1:
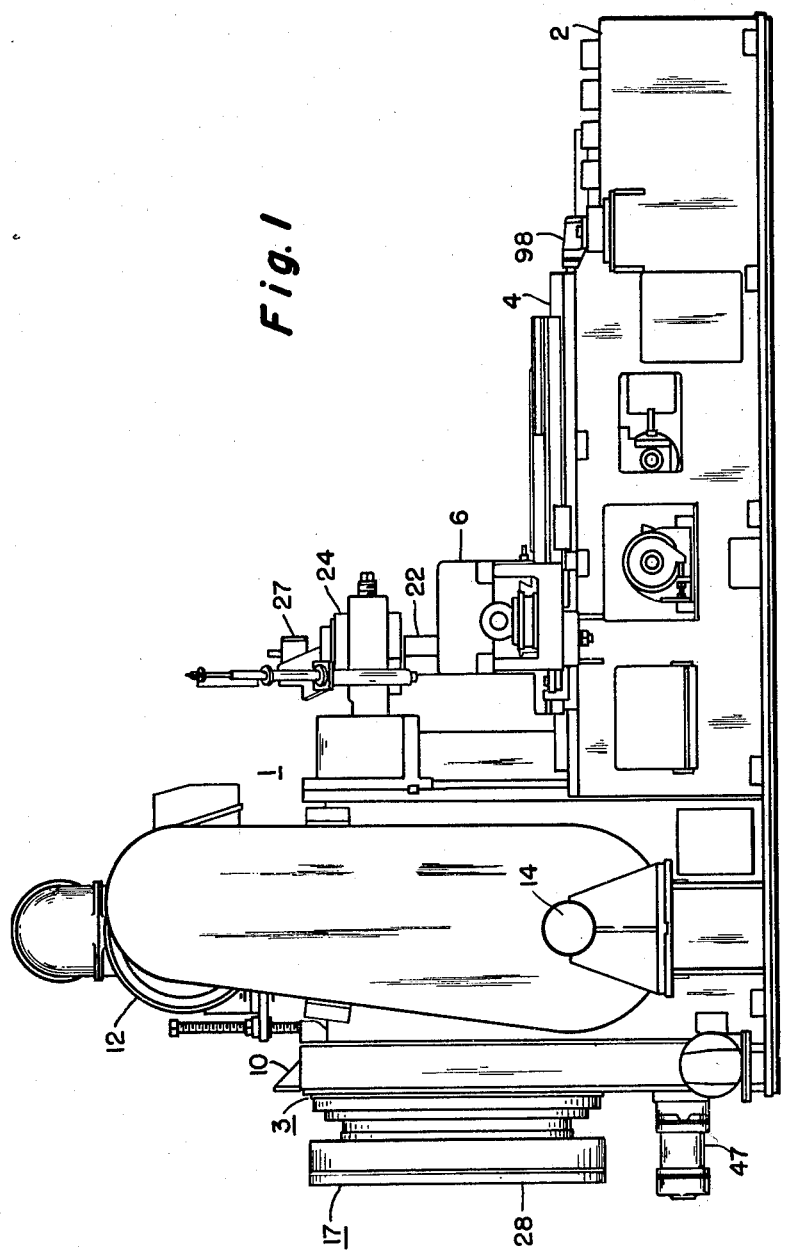
FIGURE 1 is a side elevation view of a pipe threader embodying my invention.
Figure 2:
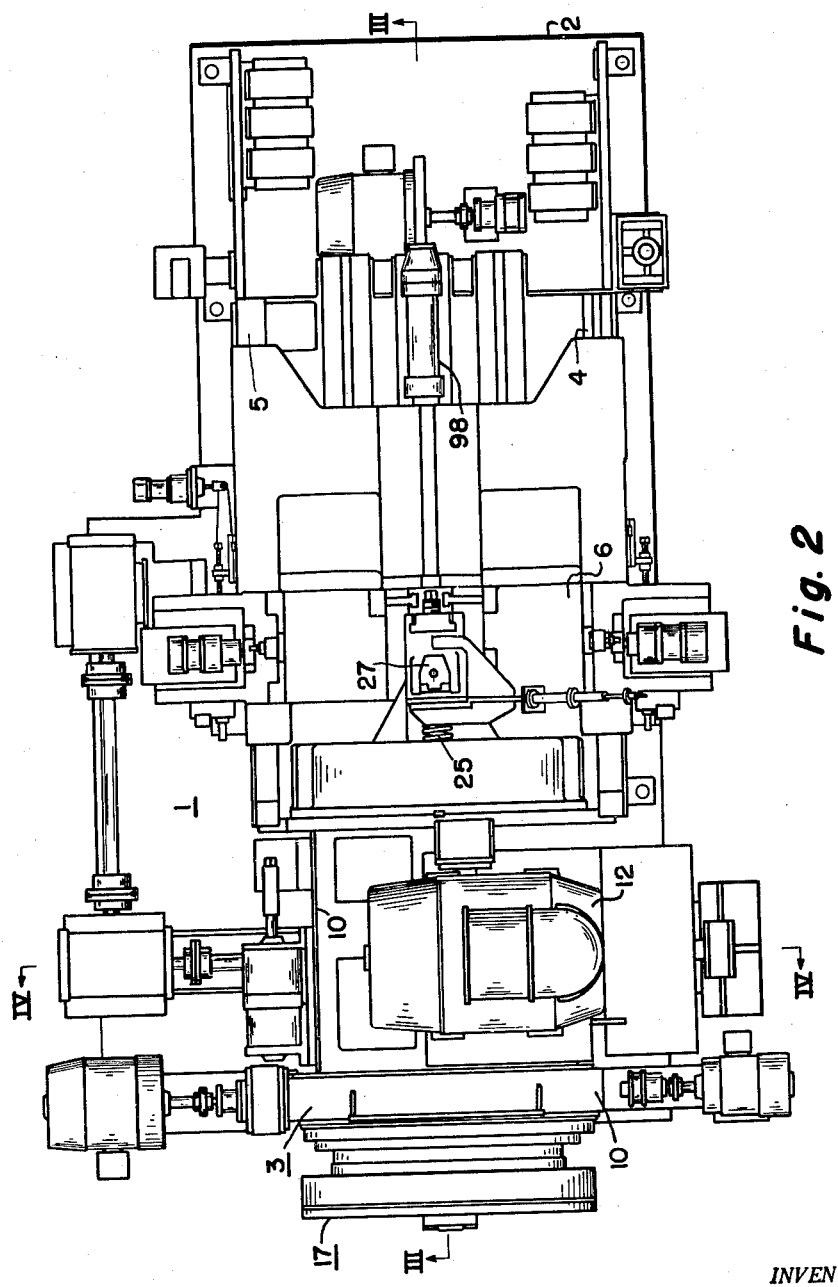
FIGURE 2 is a plan view of the pipe threader of FIGURE 1.
Figure 3:
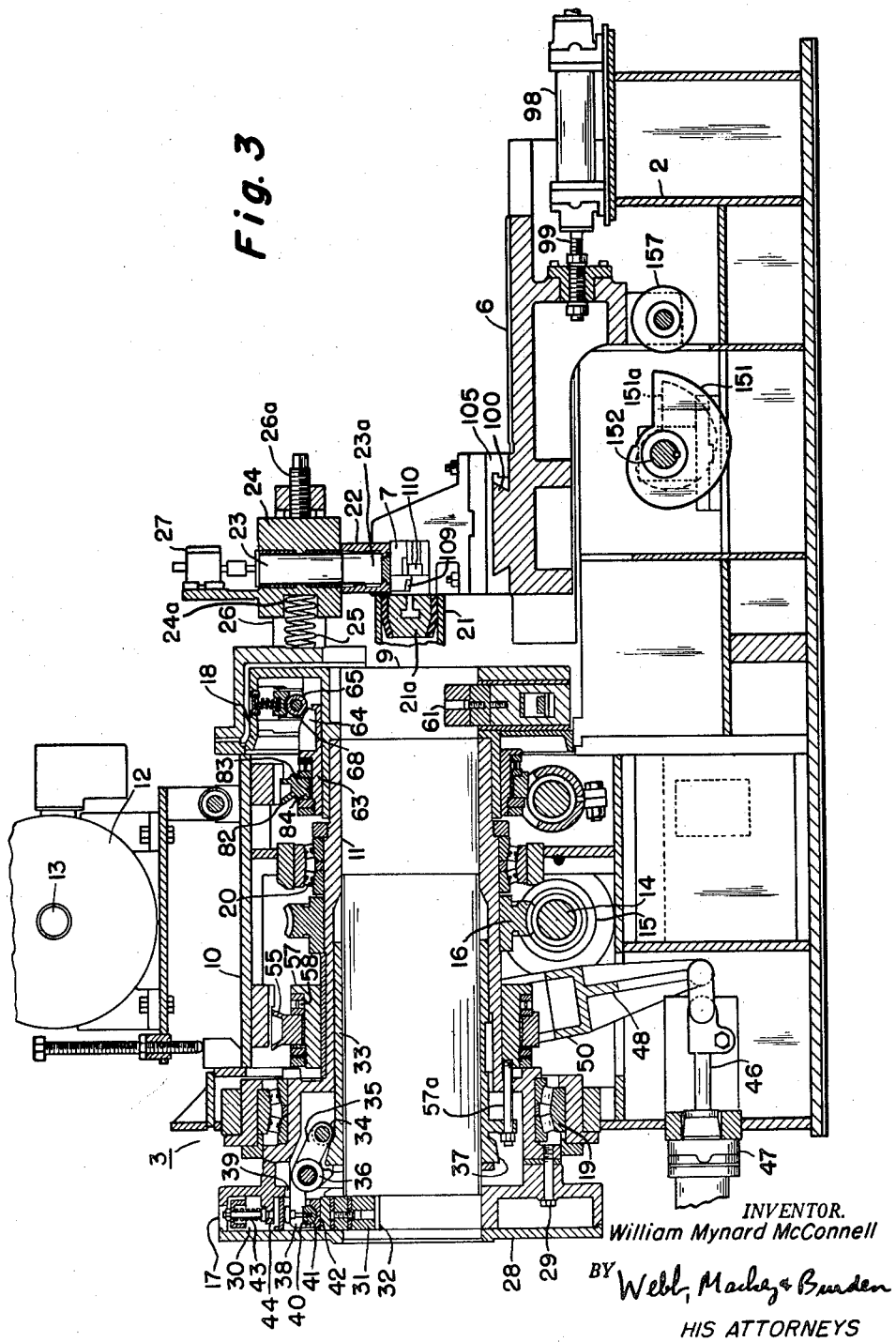
FIGURE 3 is a section view along the line III—III of FIGURE 2.

FIGURES 1-4 inclusive show a pipe threader 1 comprising a frame 2 which mounts a pipe receiver 3 for accommodating and supporting a part of a length of pipe including an end to be tapered and threaded. Disposed for travel on ways 4 and 5 of the frame 1 and located to the right of the pipe receiver, viewing FIGURES 1 and 3, is a carriage 6 supporting two tool holders 7 and 8 each of which mounts a tool for tapering the end of the pipe and a chaser for imparting threads thereto. The carriage is positioned on the frame to bring the tools and chasers into engagement with the end of a length of pipe disposed in the pipe receiver 3 which end extends a short distance out through the end 9 of the receiver 3.

Referring to FIGURES 1 and 3, the pipe receiver comprises a housing 10 which mounts therein a rotatable barrel 11 driven by a threader motor 12 positioned atop the threader. A shaft 13 of the motor is connected to a drive shaft 14 disposed transversely to and beneath the barrel 11 with the drive shaft mounting a first worm 15 which meshes with a gear 16 carried by the barrel 11. Belts (not shown) connect the motor shaft 13 to the drive shaft 14 and thereby transmit rotating power to the drive shaft for rotating the barrel 11.

Affixed to the left-hand end of the barrel 11, viewing FIGURE 3, and rotatable therewith is a primary chuck 17, and affixed to the right-hand end of the barrel and also rotatable therewith is a secondary or steady rest chuck 18. In FIGURE 3 both chucks are in open position. As shown, the barrel 11 rotates upon roller bearings 19 and 20 carried by the housing 10.

The barrel receives and accommodates part of a length of pipe 21, including the end to be threaded and tapered which extends out through the steady rest chuck and engages a pipe stop 22. The pipe stop is a roller sleeve carried by and fitting around an eccentric member 23a connected to the lower end of a rotatable, vertically disposed spindle 23 which is mounted in a block 24. A slide 26 connected to the housing 10 supports the block 24 which is disposed between an adjusting screw 26a at one end of the slide and a coil spring 25 positioned between the housing 10 and the block 24. One end of the spring 25 engages the housing 10 and the other end extends into a recess 24a of the block and there engages it. The spring 25 is under compression and urges and maintains the block 24 in engagement with one end of the adjusting screw 26a.

The Adjusting screw 26a positions the pipe stop 22 along the slide 26 to obtain a desired length of threading on the end of the pipe 21. Thus, operation of the adjusting screw 26a moves the pipe stop toward or away from the end of the housing 10 to a given position for production of a desired length of threading.

Referring to FIGURES 2, 3 and 4, the carriage 6, which mounts the tools for tapering the end of the pipe and the chasers for imparting thread to the pipe 21, moves longitudinally on the frame along a path of travel parallel to the longitudinal axis of the barrel 11. Movement of the carriage 6 on the frame is over the ways 4 and 5 to bring the tools into engagement with the pipe supported in the barrel 11. A carriage cylinder motor 98 affixed to the frame 2 supplies motivating power for advancing the carriage toward the pipe through connection of its piston rod 99 with the carriage 6.

The carriage 6 includes a cross slide way 100 extending transversely of the ways 4 and 5, as shown in FIGURES 3 and 4, and a pair of slide rails 101 and 102 affixed thereto for slidable engagement with and over the ways 4 and 5, respectively. The cross slide way is keystone-shaped and slidably mounts a pair of tool platens 105 and 106. The tool platens travel toward and away from each other on the cross slide way 100 and straddle the pipe 21 supported by the barrel 11. On each tool platen is a tool block, block 107 on platen 105 and block 108 on platen 106, which is movable thereon along a path of travel parallel to that of its platen. The tool block 107 carries the tool holder 7 and the block 108 carries the tool holder 8. Each tool holder has a taper tool 109 for tapering the end of the pipe and a chaser 110 for imparting threads thereto with the chaser carried by tool holder 8 slightly advanced relative to the chaser mounted on tool holder 7.

A screw shaft 111a extends between a post 111 affixed to each tool block and an upright 112 of each tool platen. Rotation of the screw shaft brings the tool block and its tool holder into a given position for tapering and threading the end of a pipe of a particular diameter. Once the screw shaft has moved the tool block into the given position, bolts 113 locks the tool block at the given position upon the tool platen.

The tool blocks 107 and 108 are carefully positioned and aligned to insure accurate location of the taper tools and chasers relative to the pipe end to be tapered and threaded.

Referring to FIGURES 4-7, inclusive, affixed to the carriage 6 adjacent each way and located therealong is a sine bar bracket 114 which supports a sine bar 115 for guiding the taper tool and chaser while in engagement with the end of the pipe. The sine bar extends longitudinally in the direction of and along its way and is on the outside thereof. It has a tapered side 116 which determines the amount of taper produced on the end of the pipe by the taper tool 109 and chaser 110, as will be described hereinafter. The taper side 116 inclines outwardly away from its way in a direction toward the pipe receiver 3. A T-shaped pivot pin 117 extends through the midpart of the sine bar and mounts it upon the bracket 114 so that the bar may pivot about its mounting to permit adjustment of amounts of taper produced on the end of the pipe.

Adjacent each end of the sine bar and depending therefrom on a shaft 118 is a roller which engages a taper face of a wedge block. The shaft 118 has one end disposed in the sine bar and the other end receives a pin 119 whose ends are located in a horizontal segment 120 of a right-angle support 121. Roller 122 carried adjacent one end of the sine bar engages wedge blocks 123 along its taper face 124 and roller 125 carried by the other end of the sine bar engages a wedge block 126 along its taper face 127. Bolts 128 affix the right-angle support 121 to its end of the sine bar with each support having a slot 129 which receives an end of the sine bar and which is in the vertical segment 130 of the right-angle support. Each right-angle support carries a scribe mark 131 for aligning the sine bar with the center of the threader.

The wedge blocks are spaced apart and are located in a slot 132 of the bracket which slot runs parallel to the ways 4 and 5. As located in the slot, each wedge block is opposite and in engagement with its roller and has its taper face inclining away from the ends and towards the center part of the sine bar.

An alignment shaft 133 with right-hand threads 134 which engage the wedge block 126 and with left-hand threads 135 which engage the wedge block 123 extends between the two wedge blocks and positions them so that each roller engages a corresponding part of each taper face. In other words, each wedge block is so located along the alignment shaft that rollers 122 and 125 simultaneously engage corresponding parts of the taper faces 124 and 127; i.e., a center part midway between the ends of the taper faces. When the wedge blocks have been positioned along the alignment shaft, a lock nut 136 on one end of the shaft is tightened to prevent movement of the wedge blocks out of their respective positions.

An adjustment shaft 137 connected to end 138 of the wedge block 126 and supported along its length by a projection 139 of the bracket moves the two wedge blocks simultaneously along the slot toward or away from the end of the pipe to control amounts of taper imparted thereto. Lock nuts 140 and 141 on the shaft adjacent the projection and on opposite sides thereof permit securing the wedge blocks in a desired position by operating each lock nut until it engages the projection 139. On the adjustment shaft is a pointer 142 located opposite a scale 143 which indicates amounts of taper. By turning the adjustment shaft about its longitudinal axis to move the pointer along the scale, one can easily set the wedge blocks to produce a given amount of taper on the end of the pipe.

To increase the amount of taper to be made on the end of the pipe, the adjustment shaft is turned in a direction to move the wedge blocks to the right, viewing FIGURE 5, or away from the end of the pipe. Movement of the wedge blocks to the right causes the taper face 124 of wedge block 123 to push end 144 of the sine bar in a counterclockwise direction (viewing FIGURE 5) and pivot the sine bar about its mounting in the bracket. Simultaneously, movement of the wedge block 126 to the right permits swinging of end 145 of the sine bar in a counterclockwise direction for taper face 127 inclines away from the roller 125, thus allowing pivoting of the sine bar.

To decrease the amount of taper, the adjustment shaft is turned to move the wedge blocks to the left, viewing FIGURE 5, whereby wedge block 126 causes the sine bar to swing in a clockwise direction, viewing FIGURE 5, and simultaneously moves wedge block 123 to permit pivoting of the sine bar.

Both rollers 122 and 125 engage their taper faces 124 and 127, respectively, during travel of the two blocks toward or away from the end of the pipe when the blocks are moved in the slot to vary or adjust amounts of taper to be imparted to the pipe.

At each end of the cross slide way 100 and on the outside of ways 4 and 5 is a bracket 103 (FIGURE 4) which mounts a motor cylinder 146 whose piston rod 147 connects it to the tool platens 105 and 106. The motor cylinder 146 exerts a force against the tool platen to insure that the taper tools and the chasers are maintained in working engagement with the end of the pipe for carrying out tapering and threading as the carriage travels on the ways towards the pipe receiver 3.

Two extension arms 148 of each tool platen support a sine bar roller 149 which depends from a plate 150 extending between the extension arms. The sine bar roller engages and travels along the taper side 116 of the sine bar as the carriage travels toward the pipe receiver 3, thereby determining the amount of taper produced on the end of the pipe. As the taper side inclines outwardly away from the ways in the direction of the pipe receiver 3, the sine bar roller traveling the tapered side causes the tool platen to move on the cross slide way 100 away from the pipe to produce the taper. Movement of the tool platen away from the pipe is resisted by the motor cylinder 146 which insures that the taper tools and chasers engage the pipe for the tapering and threading operation and simultaneously insures that the sine bar roller engages the taper side 116 of the sine bar.

The motor cylinder 146 also moves its tool platen into position for tapering and threading a pipe of a given diameter at the start of the operation, thereby bringing the sine bar roller into engagement with the taper side of the sine bar for travel therealong. Upon completion of the tapering and threading operation, the motor cylinder 146 withdraws the taper tool and chaser from the pipe and the sine bar roller from the sine bar by moving apart the tool platens on the way 100.

The sine bar and wedge blocks provide an excellent, rugged and sensitive control over the amounts of taper imparted to the pipe. Closer taper specifications present no problem because the wedge blocks afford easy and accurate regulation of changes in amounts of taper from one pipe to another, and, furthermore, adjustment of a plurality of chasers to produce a given taper is avoided.

Travel of the chasers while in engagement with and along the pipe during threading thereof is controlled by a thread pitch cam disk 151 (FIGURE 3) keyed to a driven shaft 152 journaled upon the frame 2. Rotation of the cam disk is related to revolutions of the barrel 11, thereby controlling thread pitch and assuring a uniform pitch in the threads. The drive shaft 14 which is driven by the motor 12 and which drives the barrel 11 through worm gearing 15 and 16 in turn drives a second shaft through a worm gear reducer. The second shaft then drives the shaft 152 which mounts the cam disk through a second worm gear reducer and a clutch.

A cam follower 157 supported by the carriage 6 engages the cam disk 151 upon advancement of the carriage towards the pipe receiver. The carriage cylinder motor maintains the cam follower in engagement with the disk cam so tht the rate of feed of the chaser to the pipe is controlled by the cam disk 151 for regulation of thread pitch. On one threader the drive shaft 14 has a speed range of 180 to 720 r.p.m.; whereas, the shaft 152 has a speed range of .1 to .4 r.p.m.

A hydraulic motor connected to the shaft returns the cam to its starting position upon completion of tapering and threading and after disengagement of the clutch.

In operation of the pipe threader 1, tapering of the end of the pipe is completed or substantially completed before threading commences. The rate of advancement of the carriage 6 along the ways 4 and 5 during the tapering operation results from a metered feed of hydraulic fluid to the cylinder motor 98. When the cam follower engages the disk 151, the disk controls advancement of the carriage along the ways and thereby regulates the ptich of the threads imparted by the chasers. To insure that the cam follower 157 remains in engagement with the cam disk throughout the threading operation, feed of hydraulic fluid to the cylinder motor 98 increases upon actuation of the limit switch 171 by the first screw adjustable cam 170.

Tapering and threading an end of pipe on my pipe threading machine comprises delivery of a length of pipe to and into the pipe receiver by conventional table rolls (not shown). The pipe enters the pipe receiver through the primary chuck and the end to be tapered and threaded travels out through the steady rest chuck into engagement with the pipe stop and into lengthwise position for the tapering and threading operations. In the event the pipe is rotating upon engagement with the stop, the mounting of the stop permits it to revolve with the pipe. Next, the primary chuck rotating at a base speed closes and grips the pipe and, thereafter, the steady rest chuck also rotating at the base speed closes and engages the pipe, thereby centering and positioning axially the end of the pipe. After closing of the two chucks, the pipe stop rotates out of engagement with the end of the pipe and rate of rotation of the pipe receiver and the pipe advances to a predetermined rate for the tapering and threading operations. Next, the tool platens move the taper tools and chasers into position for tapering and threading the pipe and bring the sine bar rollers into engagement with the sine bar. Then, the carriage cylinder motor advances the carriage from its starting position towards the pipe receiver until the tapering tools engage the end of the pipe, whereupon a metered feed of hydraulic fluid to the motor cylinder 98 regulates rate of travel of the carriage 6 along the ways for the tapering operation. As the tapering operation is completed, the cam follower engages the thread pitch cam disk which has commenced rotation upon engagement of the clutch. Thereafter, the rate of feed of the chasers to the pipe is regulated by rotation of the cam disk with the cam follower in engagement therewith as the motor cylinder 98 urges the carriage along the ways towards the pipe receiver. After completion of the tapering and threading operation, the tool platens separate; the carriage cylinder motor returns the carriage to its starting position; the clutch disengages; and the hydraulic motor returns the cam disk to its starting position.

My invention has important advantages which render it valuable to manufacturers of pipe, tubing and the like, and to fabricators who shape, form and machine elongated bars, rods, and the like, and perform work operations thereon. Especially as to threading operations, the invention plays an important role in that it assists to permit use of carbide chasers which produce an excellent finish on threads and permits threading and tapering speeds up to 600 f.p.m. Additionally, the carbide chasers have a useful life three to five times that of high speed tool steel chasers and effect superior accuracy in the threads and in the taper in the order of ±0.0005 inch in the threads of 250 pipe ends per pair of chasers. Heretofore, conventional commercial tolerances in threading operations have been ±0.002 inch–0.003 inch.

While I have shown and described a preferred embodiment of my invention, it may be otherwise embodied within the scope of the following claims.

I claim:

1. In a machine for holding and supporting a workpiece upon which is performed a work operation by a tool advanced into engagement with said workpiece, said machine having a frame, the invention comprising a tool holder means carrying said tool and movably mounted upon said frame for travel along a path which brings said tool into engagement with said workpiece, guide means on said frame positioned for engagement by a part of said tool holder means as same travels along said path and for regulation of amount of engagement of said tool with said workpiece, said guide means comprising a bar pivotally mounted at a point intermediate its ends for movement of said bar about its pivot mounting, said bar having a guide surface for engagement by said part of said tool holder means, said guide surface controlling movement of said tool holder means towards and away from said workpiece, means for positioning said bar about its pivot mounting, said positioning means comprising a pair of movable blocks, one of said blocks being disposed for engagement with at least one point of a first portion of said bar, which first portion is located in a plane disposed substantially transversely of a plane of movement of said bar about said pivot mounting and is further located between said pivot mounting and to and including one end of said bar, the other of said blocks being disposed for engagement with at least one point of a second portion of said bar, which said second portion is located in a plane disposed substantially transversely of a plane of movement of said bar about said pivot mounting and is further located between said pivot mounting and to and including the other end of said bar, each of said blocks including an angularly inclined and extending surface which is that part of its block which engages said portion of said bar, means connected to said blocks for moving same along a path which brings successive segments of said inclined surfaces into engagement with said portions of said bar to place said bar in a given position about its pivot mounting.

2. In a machine for holding and supporting a workpiece upon which is performed a work operation by a tool advanced into engagement with said workpiece, said machine having a frame, the invention comprising a tool holder means carrying said tool and movably mounted upon said frame for travel along a path which brings said tool into engagement with said workpiece, guide means on said frame positioned for engagement by a part of said tool holder means as same travels along said path and for regulation of amount of engagement of said tool with said workpiece, said guide means comprising a bar pivotally mounted at a point intermediate its ends for movement of said bar about its pivot mounting, said bar having a guide surface for engagement by said part of said tool holder means, said guide surface controlling movement of said tool holder means towards and away from said workpiece, means for positioning said bar about its pivot mounting, said positioning means comprising a pair of movable blocks, one of said blocks being disposed for engagement with at least one point of a first portion of said bar, which first portion is located in a plane disposed substantially transversely of a plane of movement of said bar about said pivot mounting and is further located between said pivot mounting and to and including one end of said bar, the other of said blocks being disposed for engagement with at least one point of a second portion of said bar, which said second portion is located in a plane disposed substantially transversely of a plane of movement of said bar about said pivot mounting and is further located between said pivot mounting and to and including the other end of said bar, each of said blocks having a surface which engages its portion of said bar, means connected to said blocks for moving same along a path which brings successive segments of said surfaces of said blocks into engagement with said portions of said bar to place said bar in a given position about its pivot mounting, each of said surfaces of said blocks extending progressively away from the central axis of said path of travel.

3. In a pipe threading machine having a frame, means for supporting and for rotating a length of pipe about its longitudinal axis, a tool holder mounting stationary tool means for tapering and/or threading an end of said pipe carried by said supporting and rotating means, a carriage adapted to travel on said frame along a path which intersects the plane of said end of said pipe to be threaded, said carriage movably mounting said tool holder for travel thereon to engage, taper and/or thread said end of said pipe, the invention comprising guide means on said frame positioned for engagement by part of said tool holder as said carriage travels along said path and for regulation of amount of engagement of said tool with said pipe, said guide means and said part of said tool holder controlling movement of said tool holder along its path of travel on said carriage, said guide means comprising a bar pivotally mounted at a point intermediate its end for movement of said bar about its pivot mounting, said bar having a guide surface disposed for engagement by said part of said tool holder as said carriage travels along said path, means for positioning said bar about its pivot mounting, said positioning means comprising a pair of movable blocks, one of said blocks being disposed for engagement with at least one point of a first portion of said bar, which first portion is located in a plane disposed substantially transversely of a plane of movement of said bar about said pivot mounting and is further located between said pivot mounting and to and including one end of said bar, the other of said blocks being disposed for engagement with at least one point of a second portion of said bar, which said second portion is located in a plane disposed substantially transversely of a plane of movement of said bar about said pivot mounting and is further located between said pivot mounting and to and including the other end of said bar, each of said blocks including an angularly inclined and extending surface which is that part of its block which engages said portion of said bar, means connected to said blocks for moving same along a path which brings successive segments of said inclined surfaces into engagement with said portions of said bar to place said bar in a given position about its pivot mounting.

4. The invention of claim 3 characterized by said guide surface of said bar being tapered for regulation of taper imparted to said end of the pipe by said tool means as said carriage advances along said path with said tool means in engagement with said pipe.

5. The invention of claim 3 characterized by means disposed on said carriage and connected to said tool holder for urging said tool of said holder into and maintaining it in engagement with said pipe.

6. In a pipe threading machine having a frame, means for supporting and for rotating a length of pipe about its longitudinal axis, a tool holder mounting stationary tool means for tapering and/or threading an end of said pipe carried by said supporting and rotating means, a carriage adapted for travel on said frame along a path which intersects the plane of said end of said pipe to be threaded, said carriage movably mounting said tool holder for travel thereon to engage, taper and/or thread said end of said pipe, the invention comprising guide means on said frame positioned for engagement by part of said tool holder as said carriage travels along said path and for regulation of amount of engagement of said tool with said pipe, said guide means and said part of said tool holder controlling movement of said tool holder along its path of travel on said carriage, said guide means comprising a bar pivotally mounted at a point intermediate its ends for movement of said bar about its pivot mounting, said bar having a guide surface disposed for engagement by said part of said tool holder as said carriage travels along said path, means for positioning said bar about its pivot mounting, said positioning means comprising a pair of movable blocks, one of said blocks being disposed for engagement with at least one point of a first portion of said bar, which first portion is located in a plane disposed substantially transversely of a plane of movement of said bar about said pivot mounting and is further located between said pivot mounting and to and including one end of said bar, the other of said blocks being disposed for engagement with at least one point of a second portion of said bar, which said second portion is located in a plane disposed substantially transversely of a plane movement of said bar about said pivot mounting and is further located between said pivot mounting and to and including the other end of said bar, each of said blocks having a surface which engages its portion of said bar, means connected to said blocks for moving same along a path which brings successive segments of said surfaces of said blocks into engagement with said portions of said bar to place said bar in a given position about its pivot mounting, each of said surfaces of said blocks extending progressively away from the central axis of said path of travel.

7. The invention of claim 6 characterized by said guide surface of said bar being tapered for regulation of taper imparted to said end of the pipe by said tool means as said carriage advances along said path with said tool means in engagement with said pipe.

8. The invention of claim 6 characterized by means disposed on said carriage and connected to said tool holder for urging of said tool of said holder into and maintaining it in engagement with said pipe.

References Cited by the Examiner

UNITED STATES PATENTS

| 1,809,019 | 6/31 | Buckley | 10—101 |
| 2,309,298 | 1/43 | Bickel | 82—17 |

ANDREW R. JUHASZ, *Primary Examiner.*